(12) United States Patent
Minowa et al.

(10) Patent No.: US 9,898,011 B2
(45) Date of Patent: Feb. 20, 2018

(54) DRIVING ASSISTANCE SYSTEM AND PROGRAM FOR DRIVING ACCORDING TO OPERATIONS MANAGEMENT

(71) Applicant: HITACHI CONSTRUCTION MACHINERY CO., LTD., Tokyo (JP)

(72) Inventors: Toshimichi Minowa, Mito (JP); Tomoyuki Hamada, Tsuchiura (JP); Hidefumi Ishimoto, Toride (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 15/122,527

(22) PCT Filed: Sep. 30, 2014

(86) PCT No.: PCT/JP2014/076147
§ 371 (c)(1),
(2) Date: Aug. 30, 2016

(87) PCT Pub. No.: WO2016/051524
PCT Pub. Date: Apr. 7, 2016

(65) Prior Publication Data
US 2017/0068249 A1  Mar. 9, 2017

(51) Int. Cl.
*G08G 1/00* (2006.01)
*G05D 1/02* (2006.01)
(Continued)

(52) U.S. Cl.
CPC .......... *G05D 1/0291* (2013.01); *G01C 21/36* (2013.01); *G05D 1/0088* (2013.01);
(Continued)

(58) Field of Classification Search
CPC ......... G05D 1/0291; G05D 2201/0202; G01C 21/26; G08G 1/096816; G08G 1/207; G08G 1/202
See application file for complete search history.

(56) References Cited

U.S. PATENT DOCUMENTS

| | | | |
|---|---|---|---|
| 6,292,725 B1* | 9/2001 | Kageyama | G05D 1/027 180/169 |
| 6,351,697 B1* | 2/2002 | Baker | G01G 23/3728 342/357.24 |
| 2016/0033968 A1* | 2/2016 | Sakai | G08C 17/02 701/23 |

FOREIGN PATENT DOCUMENTS

| | | |
|---|---|---|
| JP | 09-231500 A | 9/1997 |
| JP | 2000-339029 A | 12/2000 |

(Continued)

OTHER PUBLICATIONS

International Search Report of PCT/JP2014/076147 dated Jan. 13, 2015.

*Primary Examiner* — Michael J Zanelli
(74) *Attorney, Agent, or Firm* — Mattingly & Malur, PC

(57) ABSTRACT

Provided is a technology that, when an unmanned haulage vehicle and a manned haulage vehicle are allowed to exist together and are subjected to fleet operations management, can provide driving assistance to an operator of the manned vehicle by using control data similar to those to be transmitted to the unmanned haulage vehicle. To this end, the manned vehicle is provided with a terminal-side communication control unit, a control command value conversion unit and a control command value providing unit. The terminal-side communication control unit receives, from a fleet operations management server that performs operations management of the unmanned haulage vehicle, a control command value for allowing the unmanned haulage vehicle (Continued)

to travel autonomously. The control command value conversion unit converts contents of the control command value to perceivable information. The control command value providing unit provides the perceivable information to the operator.

10 Claims, 13 Drawing Sheets

(51) Int. Cl.
    *G08G 1/09*     (2006.01)
    *G08G 1/137*     (2006.01)
    *G05D 1/00*     (2006.01)
    *G06K 9/00*     (2006.01)
    *G08G 1/01*     (2006.01)
    *G08G 1/0968*     (2006.01)
    *H04W 4/02*     (2009.01)
    *G01C 21/36*     (2006.01)
    *H04L 29/08*     (2006.01)

(52) U.S. Cl.
    CPC ....... *G06K 9/00791* (2013.01); *G08G 1/0112* (2013.01); *G08G 1/09* (2013.01); *G08G 1/09685* (2013.01); *G08G 1/096816* (2013.01); *G08G 1/096888* (2013.01); *G08G 1/137* (2013.01); *G08G 1/202* (2013.01); *G08G 1/207* (2013.01); *H04L 67/12* (2013.01); *H04W 4/02* (2013.01); *G05D 2201/0202* (2013.01)

(56) References Cited

FOREIGN PATENT DOCUMENTS

| | | |
|---|---|---|
| JP | 2001-109519 A | 4/2001 |
| JP | 2003-141692 A | 5/2003 |
| JP | 2007-323675 A | 12/2007 |
| JP | 2013-169956 A | 9/2013 |
| WO | 98/45765 A1 | 10/1998 |

* cited by examiner

FIG. 7

| 701 | 702 | 703 | 704 | 705 | 706 | 707 |
|---|---|---|---|---|---|---|
| DUMP TRUCK IDS | FORWARD BOUNDARY POINTS | BACKWARD BOUNDARY POINTS | DESTINATIONS | TRAVEL SPEEDS | TRAVEL DIRECTIONS | CURRENT POSITIONS |
| $D_1$ | $N_{n-2}$ | $N_n$ | $P_1$ | $VD_1$ | F | $N_{n-1}$ |
| $D_2$ | $N_n$ | $N_{n+2}$ | $P_2$ | $VD_2$ | R | $N_{n+1}$ |
| $D_3$ | $N_{n+2}$ | $N_{n+4}$ | $P_3$ | $VD_3$ | F | $N_{n+3}$ |

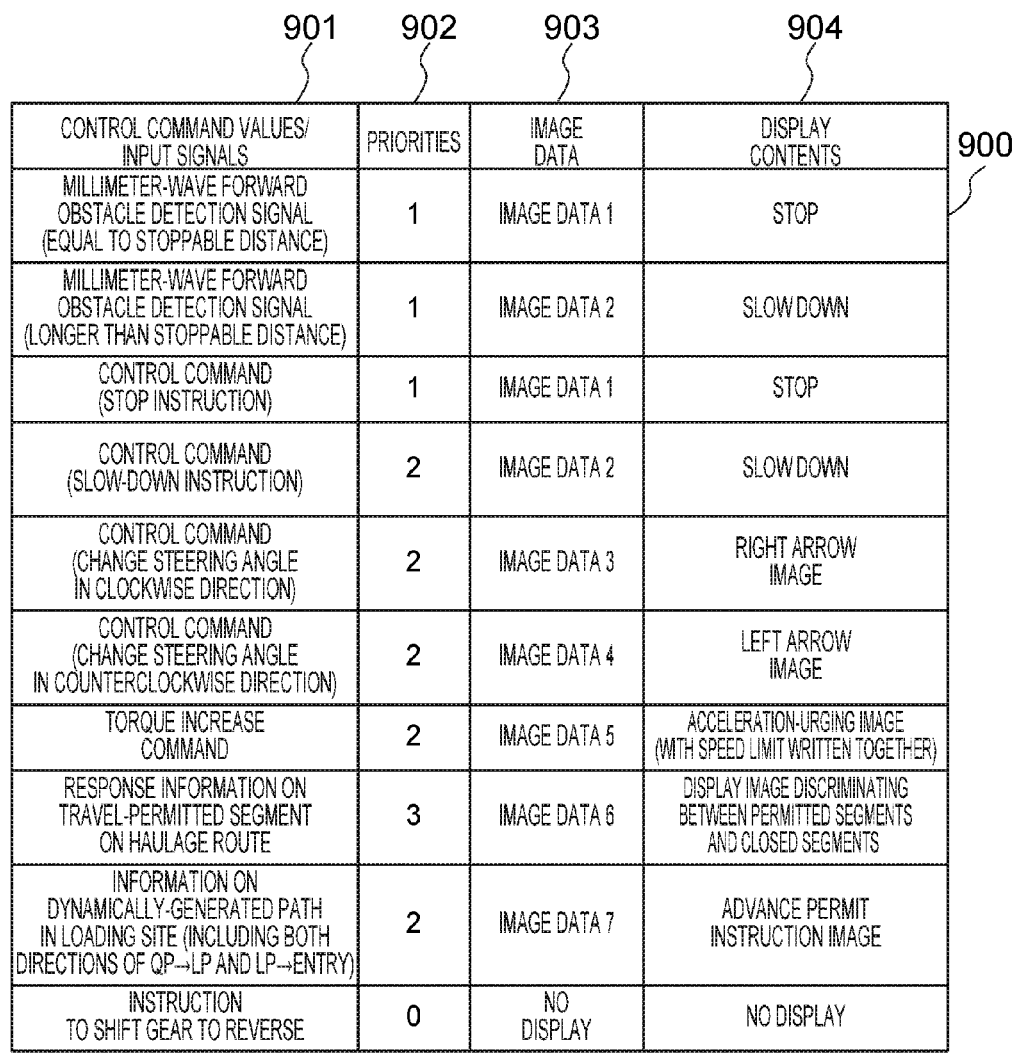

| CONTROL COMMAND VALUES/ INPUT SIGNALS | PRIORITIES | IMAGE DATA | DISPLAY CONTENTS |
|---|---|---|---|
| MILLIMETER-WAVE FORWARD OBSTACLE DETECTION SIGNAL (EQUAL TO STOPPABLE DISTANCE) | 1 | IMAGE DATA 1 | STOP |
| MILLIMETER-WAVE FORWARD OBSTACLE DETECTION SIGNAL (LONGER THAN STOPPABLE DISTANCE) | 1 | IMAGE DATA 2 | SLOW DOWN |
| CONTROL COMMAND (STOP INSTRUCTION) | 1 | IMAGE DATA 1 | STOP |
| CONTROL COMMAND (SLOW-DOWN INSTRUCTION) | 2 | IMAGE DATA 2 | SLOW DOWN |
| CONTROL COMMAND (CHANGE STEERING ANGLE IN CLOCKWISE DIRECTION) | 2 | IMAGE DATA 3 | RIGHT ARROW IMAGE |
| CONTROL COMMAND (CHANGE STEERING ANGLE IN COUNTERCLOCKWISE DIRECTION) | 2 | IMAGE DATA 4 | LEFT ARROW IMAGE |
| TORQUE INCREASE COMMAND | 2 | IMAGE DATA 5 | ACCELERATION-URGING IMAGE (WITH SPEED LIMIT WRITTEN TOGETHER) |
| RESPONSE INFORMATION ON TRAVEL-PERMITTED SEGMENT ON HAULAGE ROUTE | 3 | IMAGE DATA 6 | DISPLAY IMAGE DISCRIMINATING BETWEEN PERMITTED SEGMENTS AND CLOSED SEGMENTS |
| INFORMATION ON DYNAMICALLY-GENERATED PATH IN LOADING SITE (INCLUDING BOTH DIRECTIONS OF QP→LP AND LP→ENTRY) | 2 | IMAGE DATA 7 | ADVANCE PERMIT INSTRUCTION IMAGE |
| INSTRUCTION TO SHIFT GEAR TO REVERSE | 0 | NO DISPLAY | NO DISPLAY |

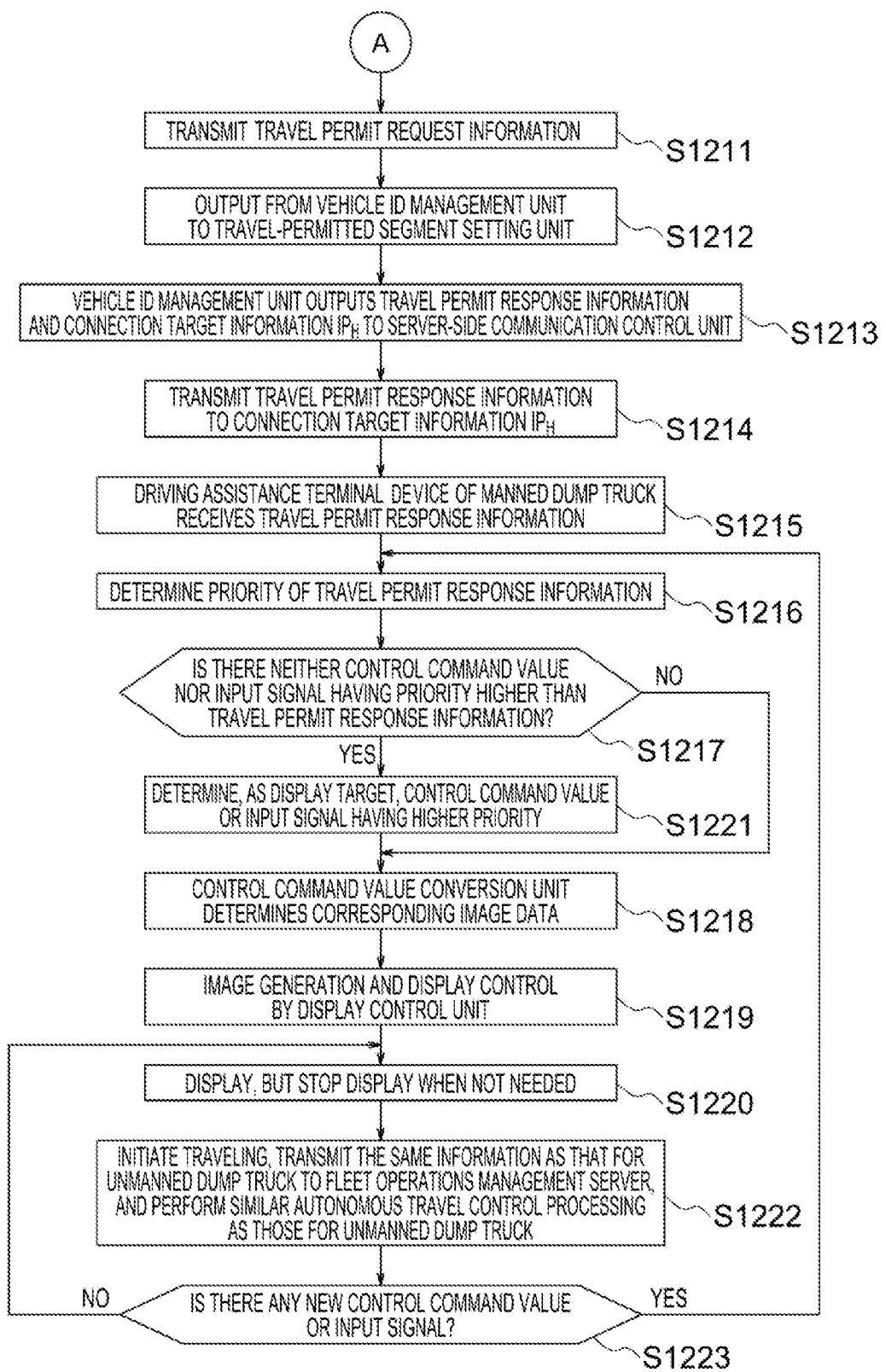

DRIVING ASSISTANCE SYSTEM AND PROGRAM FOR DRIVING ACCORDING TO OPERATIONS MANAGEMENT

TECHNICAL FIELD

This invention relates to a driving assistance system, a vehicle, driving assistance terminal device, and a driving assistance program, and specifically to a driving assistance technology under a situation that at least one unmanned vehicle, which travels autonomously, and a manned vehicle, on which an operator rides to operate the same, exist and travel together.

BACKGROUND ART

As a technology for allowing unmanned vehicles and a manned vehicle to exist and travel together, Patent Document 1 discloses: "The vehicle control device (mounted on each unmanned vehicle) controls the steering angle, brakes, transmission and engine rotation speed on the basis of the data on the current position and the current velocity of the vehicle measured by the position measurement device, the command data to indicate such commands as stop and deceleration from the monitoring station received by the monitoring station-vehicle communication device, the control data to indicate such control commands as deceleration received from another vehicle via the inter-vehicle communication device, the detection signal of the obstacle sensor, and the course data stored in the course data storage device. In other words, the target engine rotation speed is set, and the fuel oil consumption is controlled according to the electric signals to be applied to an electronic control governor to change the engine rotation speed . . . the manned vehicle has a display for displaying the content of the instruction data, such as instructions on the target position of the vehicle and the course to travel (predetermined traveling path), instructions to stop, instructions to decelerate transmitted from the monitoring station, and later mentioned control command data, which is input from another vehicle via the inter-vehicle communication device, and in normal cases, the operator controls various predetermined operations according to the content displayed on this display, and the operator manually controls the steering angle, brake, transmission and engine rotation speed. (extracted from the specification)".

PRIOR ART DOCUMENT

Patent Document

Patent Document 1: WO 98/045765

DISCLOSURE OF THE INVENTION

Problem to be Solved by the Invention

In Patent Document 1, the vehicle control device on the unmanned vehicle controls, for example, the engine rotation speed by using received control data. However, the control data is a signal for actuating a vehicle drive control device such as the electronic control governor, so that the operator cannot promptly interpret the signal even when he or she looks at the signal. On the other hand, the indication from the monitoring station, said indication being to be displayed on the display mounted on the manned vehicle, is required to have contents that the operator can visually recognize and understand, and therefore is required to be displayed in a natural language instead of as the control signal itself. In Patent Document 1, it is, therefore, necessary to change control data, which is to be transmitted, depending on whether the destination of transmission of the control data from the monitoring station is the unmanned vehicle or the manned vehicle (see FIG. 3 and FIG. 4 in Patent Document 1). When it is desired to add a manned vehicle to unmanned vehicles and to allow the manned vehicle to behave in the same way as the unmanned vehicles, a control command hence needs to be changed between the unmanned vehicles and the manned vehicle, leading to a problem that processing becomes complex at a server which performs fleet operations control of the unmanned and manned vehicles.

To solve the above-described problem, this invention has as an object thereof the provision of a technology that upon allowing at least one unmanned haulage vehicle and a manned haulage vehicle to exist together and subjecting them to travel management, can provide driving assistance to an operator of the manned haulage vehicle by using control data similar to those to be transmitted to the unmanned haulage vehicle.

Means for Solving the Problem

To solve the above-described problem, the present invention is characterized in that, in a driving assistance system in which a fleet operations management server, which performs operations management of at least one unmanned vehicle that autonomously travels without riding of any operator thereon, and driving assistance terminal device, which is mounted on a manned vehicle operated by an operator, are connectable together for communications via a wireless communication network, the fleet operations management server includes a server-side communication control unit that performs control to establish a communicable connection with the driving assistance terminal device, a control command value generation unit that generates a control command value to allow the unmanned vehicle to travel autonomously, and a vehicle identification information management unit that manages connection target information, which is to specifically identify the driving assistance terminal device as a connection target of a wireless communication, and control target vehicle identification information, which is to be used upon generation of the control command value for the manned vehicle, in association with each other; the driving assistance terminal device includes a request information processing unit that generates request information for requesting the control command value to the fleet operations management server, a control command value conversion unit that converts contents of the control command value to perceivable information, a control command value providing unit that provides the perceivable information to the operator, and a terminal-side communication control unit that performs control to transmit the request information, together with the connection target information for the driving assistance terminal device added thereto, to the fleet operations management server; the server-side communication control unit outputs the request information to the vehicle identification information management unit upon receipt of the same; the vehicle identification information management unit acquires the connection target information for the driving assistance terminal device, said connection target information being included in the request information, to bring the connection target information into association with the control target vehicle identification information, and outputs the control target vehicle identification information and request information to the control command value generation unit; the control command value generation unit generates the control command value according to the request information, and outputs the control command value together with the control target vehicle identification information to the vehicle identification information management unit; the vehicle identification information management unit outputs the connection target information, which has been brought into association with the control target vehicle identification information, and the control command value to the server-side communication control unit; and using the connection target information as a destination of transmission, the server-side communication control unit transmits the control command value to the driving assistance terminal device.

The present invention also provides driving assistance terminal device useful in the above-described driving assistance system, a vehicle with the driving assistance terminal device mounted thereon, and a driving assistance program to be executed by the driving assistance terminal device.

Advantageous Effects of the Invention

According to the present invention, it is possible to provide a technology that upon allowing at least one unmanned haulage vehicle and a manned haulage vehicle to exist together and subjecting them to travel management, can provide driving assistance to an operator of the manned haulage vehicle by using control data similar to those to be transmitted to the unmanned haulage vehicle. Problems, configurations and advantageous effects other than those described above will become apparent from the description of the following embodiment.

BRIEF DESCRIPTION OF THE DRAWINGS

FIGS. 2A to 2C are diagrams showing external appearances of driving assistance terminal device, in which FIG. 2A shows an installation example of the driving assistance terminal device in a cab of a manned dump truck, FIG. 2B is another installation example of the driving assistance terminal device, in which a display device as standard device is used, and FIG. 2C is a further installation example of the driving assistance terminal device, in which mobile terminal device is used.

FIGS. 6A and 6B illustrate map information, in which FIG. 6A illustrates node information and FIG. 6B illustrates link information.

FIG. 7 is a diagram illustrating fleet operations management information.

FIGS. 8A and 8B are diagrams illustrating transitions of vehicle ID information, in which FIG. 8A illustrates an example in which a reserve ID is used, and FIG. 8B illustrates an example in which overwriting processing of connection target information is used.

FIG. 9 is a diagram illustrating the configuration of a conversion dictionary.

FIGS. 10A through 10G show display states of image data in FIG. 9, in which FIG. 10A shows the display state of Image Data 1, FIG. 10B shows the display state of Image Data 2, FIG. 10C shows the display state of Image Data 3, FIG. 10D shows the display state of Image Data 4, FIG. 10E shows the display state of Image Data 5, FIG. 10F shows the display state of Image Data 6, and FIG. 10G shows the display state of Image Data 7.

FIGS. 11A and 11B are diagrams illustrating travel states of dump trucks, in which FIG. 11A illustrates a state in which only unmanned dump trucks are allowed to travel autonomously, and FIG. 11B illustrates a travel state in which a manned dump truck is allowed to travel together with unmanned dump trucks.

FIG. 13 is a flow chart illustrating the flow of operation (the second half; continued from FIG. 12) by the driving assistance system.

MODES FOR CARRYING OUT THE INVENTION

In the following embodiment, a description will be made by dividing the embodiment into plural sections or embodiments wherever needed for the sake of convenience. When the numbers of elements and the like (including the numbers of parts or components, numerical values, amounts, ranges, and so on) are referred to in the following embodiment, they shall not be limited to any specific numbers and may be greater or smaller than such specific numbers unless specifically indicated or unless apparently limited to such specific numbers in principle. In the following embodiment, its constituent elements (including processing steps and the like) are not absolutely essential unless specifically indicated or unless clearly considered to be essential in principle.

Further, the individual configurations, functions, processing units, processing means and the like in the following embodiment may be partly or wholly realized, for example, as integrated circuits or other hardware. Alternatively, the below-described individual configurations, functions, processing units, processing means and the like may be realized as programs to be executed on a computer, in other words, may be realized as software. Information on programs, tables, files and the like, which realize the individual configurations, functions, processing units, processing means and the like, can be stored in storage devices such as memories, hard disks or SSDs (solid state drives) or the like or storage media such as IC cards, SD cards or DVDs.

The embodiment of the present invention will hereinafter be described in detail based on the drawings. Throughout the drawings that show or illustrate the embodiment, members having the same functions are identified by the same or related designations, and their repeated descriptions will be omitted. It is also to be noted that in the following embodiment, the description of the same or similar parts will not be repeated as a general rule unless specifically needed.

Figure 1:
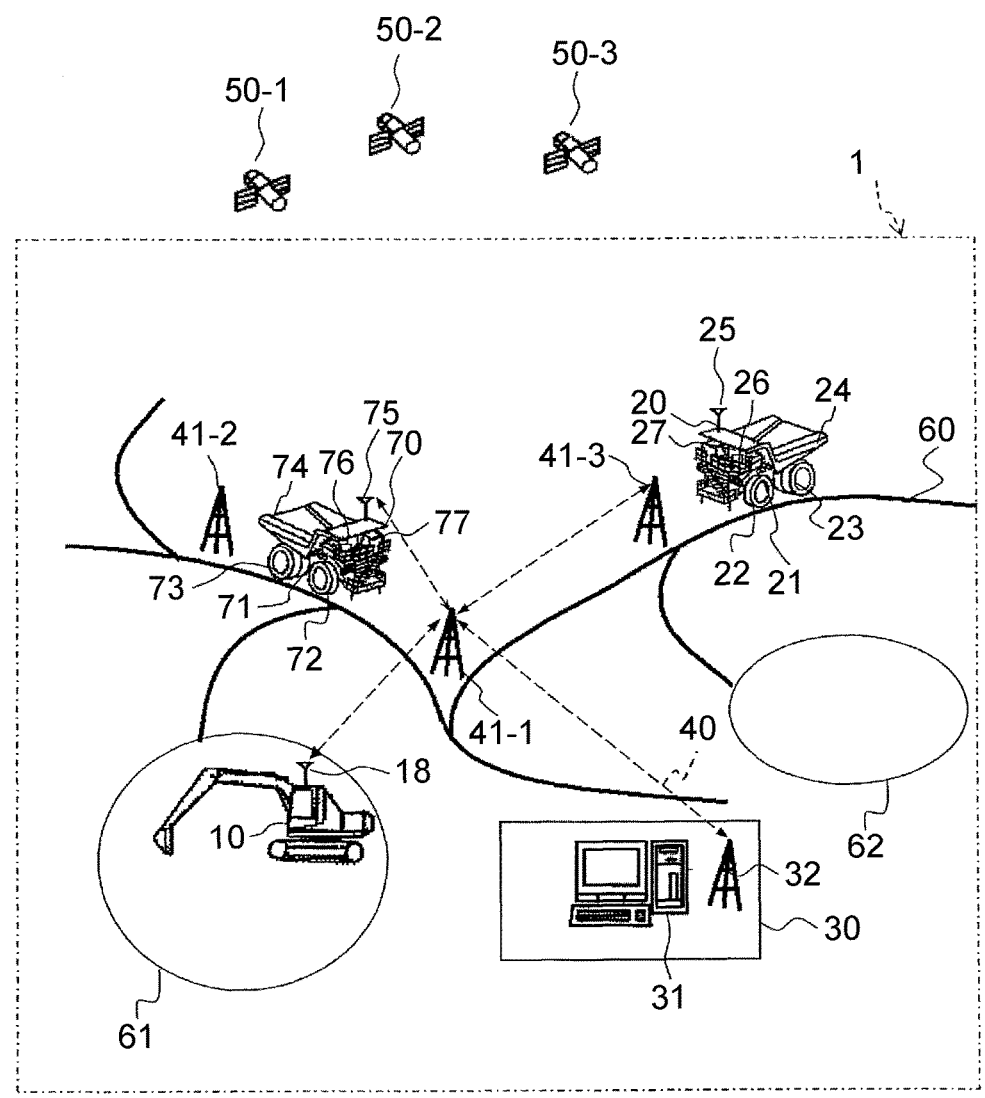
FIG. 1 is a diagram illustrating the schematic configuration of a mine where a driving assistance system according to the present invention is used.

Referring to FIG. 1, a description will first be made about a driving assistance system to which the present invention has been applied. FIG. 1 is a diagram illustrating the schematic configuration of a mine where the driving assistance system according to the present invention is used.

The driving assistance system 1 for dump trucks illustrated in FIG. 1 is configured by communicably connecting an excavator 10, an unmanned dump truck 20, a manned dump truck 70 and a fleet operations management server 31 via a wireless communication network 40. The excavator 10 performs loading work of rock or ore at a quarry such as a mine. The unmanned dump truck 20 is a haulage vehicle (hereinafter called "dump truck") for hauling a payload such as rock or ore, and travels autonomously according to instructions from the fleet operations management server 31 without riding of any operator thereon. The manned dump truck 70 is operated by an operator who rides thereon. The fleet operations management server 31 is installed at a control center 30 near to or remote from the quarry, and performs fleet operations management of the dump trucks 20,70. The manned dump truck 70 is an example of a manned vehicle, and instead of the manned haulage vehicle, can be a working vehicle such as a light vehicle that transports personnel, a motor grader that performs leveling or smoothing of road surfaces, or a sprinkler truck.

The unmanned dump truck 20 is provided with autonomously traveling terminal device 26 (hereinafter abbreviated as "the traveling terminal device") for autonomously traveling according to a control command value (instruction signal) for autonomous traveling from the fleet operations management server 31.

The manned dump truck 70 is provided with driving assistance terminal device 76 that provides the control command value from the fleet operations management server 31 to the operator by using at least one of perceivable information.

The dump trucks 20,70 travel back and forth between a loading site 61, where the excavator 10 is placed, and a dumping site 62 along a travel route 60 set beforehand in the mine.

The excavator 10 and dump trucks 20,70 are each provided with a position calculation system (its illustration is omitted in FIG. 1), which receives positioning radio waves from at least three navigation satellites 50-1,50-2,50-3 of a global navigation satellite system (GNSS: Global Navigation Satellite System) to acquire the position of the own vehicle. As the GNSS, GPS (Global Positioning System), GLONASS or GALILEO may be used, for example.

The excavator 10 is a super jumbo hydraulic excavator, and an antenna 18 is installed for connection with the wireless communication network at a location of good visibility on the excavator 10, for example, on an upper part of a cab.

The unmanned dump truck 20 and manned dump truck 70 each include a frame 21 or 71 that forms a main body, front wheels 22 or 72 and rear wheels 23 or 73, a body 24 or 74 pivotal in an up-and-down direction about hinge pins (not illustrated) arranged as a center of pivotal motion on a rear part of the frame 21 or 71, and a pair of left and right hoist cylinders (not illustrated) that cause the body 24 or 74 to pivot in the up-and-down direction. In addition, an antenna 25 or 75 is installed for connection with the wireless communication network 40 at a location of good visibility, for example, on a front part of a top wall of the dump truck 20 or 70. In addition, a cab 22 or 27 is mounted on an upper front part of the frame 21 or 71.

The unmanned dump truck 20 is provided with the traveling terminal device 26 that performs autonomous travel control according to control command values received from the fleet operations management server 31 via the wireless communication network 40.

On the other hand, the manned dump truck 70 is provided with the driving assistance terminal device 76 that provides each control command value, which has been received from the fleet operations management server 31 via the wireless communication network 40, after converting it to perceivable information. The perceivable information can be a natural language which the operation can easily understand, visual information such as image data or blinking light, or auditory information such as an alarm sound or an announcement. In this embodiment, a description will be made by taking, as an example, a mode in which each control command value is displayed after converting it to visual information. However, the conversion results of the control command value may be provided to the operator by using an alarm or speaker.

The fleet operations management server 31 is connected to an antenna 32 for its connection to the wireless base stations 41-1,41-2,41-3 via the wireless communication network 40. The fleet operations management server 31 then communicates with the excavator 10, unmanned dump truck 20 and manned dump truck 70, respectively, via the wireless base stations 41-1,41-2,41-3.

Figure 2A:
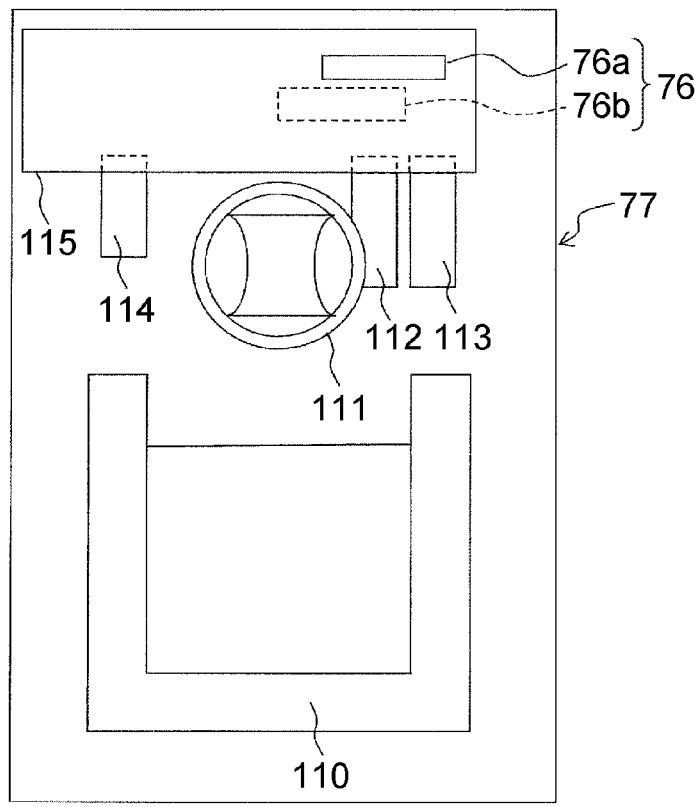
Figure 2B:
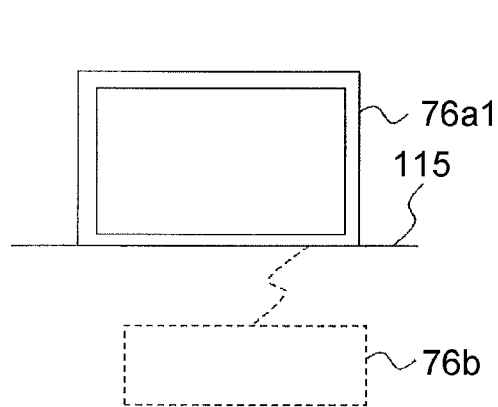
Figure 2C:
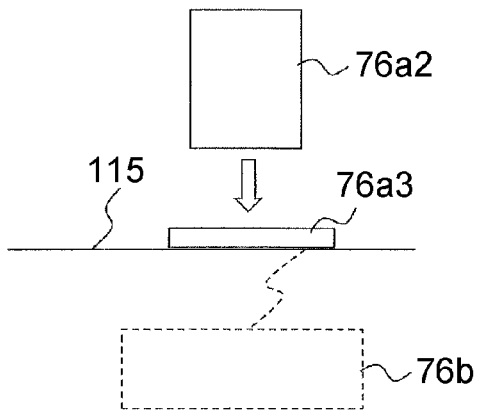

Referring to FIG. 2, a description will next be made about the schematic configuration in the cab 77 of the manned dump truck 70. FIGS. 2A to 2C are diagrams showing external appearances of the driving assistance terminal device, in which FIG. 2A shows an installation example of the driving assistance terminal device in the cab of the manned dump truck, FIG. 2B is another installation example of the driving assistance terminal device, in which a display device as standard device is used, and FIG. 2C is a further installation example of the driving assistance terminal device, in which mobile terminal device is used.

As shown in FIG. 2A, a seat 110 on which the operator is to sit is disposed in the cab 77, and a steering wheel 111 is disposed in front of the operator sitting on the seat. On a right side of a base of a column for the steering wheel 111, a normal brake pedal 112 and an accelerator pedal 113 are disposed. On a left side of the base of the column for the steering wheel 111, on the other hand, an emergency brake pedal 114 is disposed.

In front of the steering wheel 111, a front panel 115 is disposed. The front panel 115 includes meters, a camera monitor that displays a captured image of a surrounding of the dump truck, and so on. On a right side of an upper part of the front panel 115, the driving assistance terminal device 76 is disposed. The driving assistance terminal device 76 includes a display device 76a with a liquid crystal panel or organic EL panel included therein, and also a terminal device main body 76b that performs display control on the display device 76a and conversion processing of each control command value. The display device 76a is disposed on the front panel 115, while the terminal device main body 76b is accommodated within the interior of the front panel 115.

As shown in FIG. 2B, the display device 76a may be a monitor 76a1 arranged as standard device on the front panel 115, or as shown in FIG. 2C, may be configured such that information mobile terminal device (for example, a smartphone or tablet terminal) 76a2 is electrically connected with the terminal device main body 76b by arranging a cradle 76a3 as a standard accessory on the front panel 115 and placing the information mobile terminal device 76a2 on the cradle 76a3. As a further alternative, the driving assistance terminal device 76 may be configured with the information mobile terminal device 76a2 alone by storing a driving assistance program, which is to execute the function of the terminal device main body 76b, in the information mobile terminal device 76a2.

In the foregoing, the description was made by taking, as an example, the interior of the cab 77 of the manned dump truck 70. However, the driving assistance terminal device 76 may be disposed in the cab 27 of the unmanned dump truck 20, and upon performing traveling under operation by an operator instead of autonomous traveling, information may be provided to the operator of the unmanned dump truck 20 such that the unmanned dump truck 20 is allowed to travel according to a control command value from the fleet operations management server 31.

Figure 3:
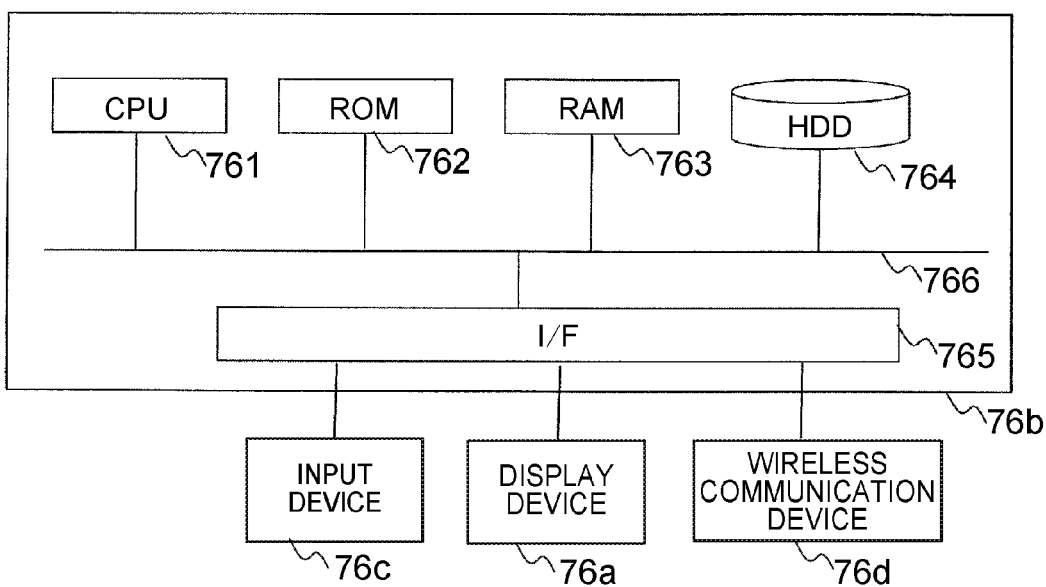
FIG. 3 is a hardware configuration diagram of the driving assistance terminal device.

With reference to FIG. 3, a description will be made about the hardware configuration of the driving assistance terminal device 76. FIG. 3 is a hardware configuration diagram of the driving assistance terminal device.

As depicted in FIG. 3, the terminal device main body 76b is configured by connecting CPU (Central Processing Unit) 761, ROM (Read Only Memory) 762, RAM (Random Access Memory) 763, HDD (Hard Disk Drive) 764 and I/F 765 to each other via a bus 766. To the I/F 765, the display device 76a, an input device 76c and a wireless communication device 76d are connected. The input device 76c is configured of a touch panel, buttons or the like stacked on the screen of the display device 76a. The wireless communication device 76d is a device that can communicate to the wireless communication network 40.

The CPU 761 executes the driving assistance program, which is stored in the ROM 763 or HDD 764, by loading it in the RAM 762. In other words, the function of the driving assistance terminal device 76 can be realized by cooperation of hardware, which makes up the driving assistance terminal device 76, and the driving assistance program (software).

The fleet operations management server 31 and traveling terminal device 26 are also of hardware configurations similar to the driving assistance terminal device 76, so that their overlapped descriptions are omitted.

Figure 4:
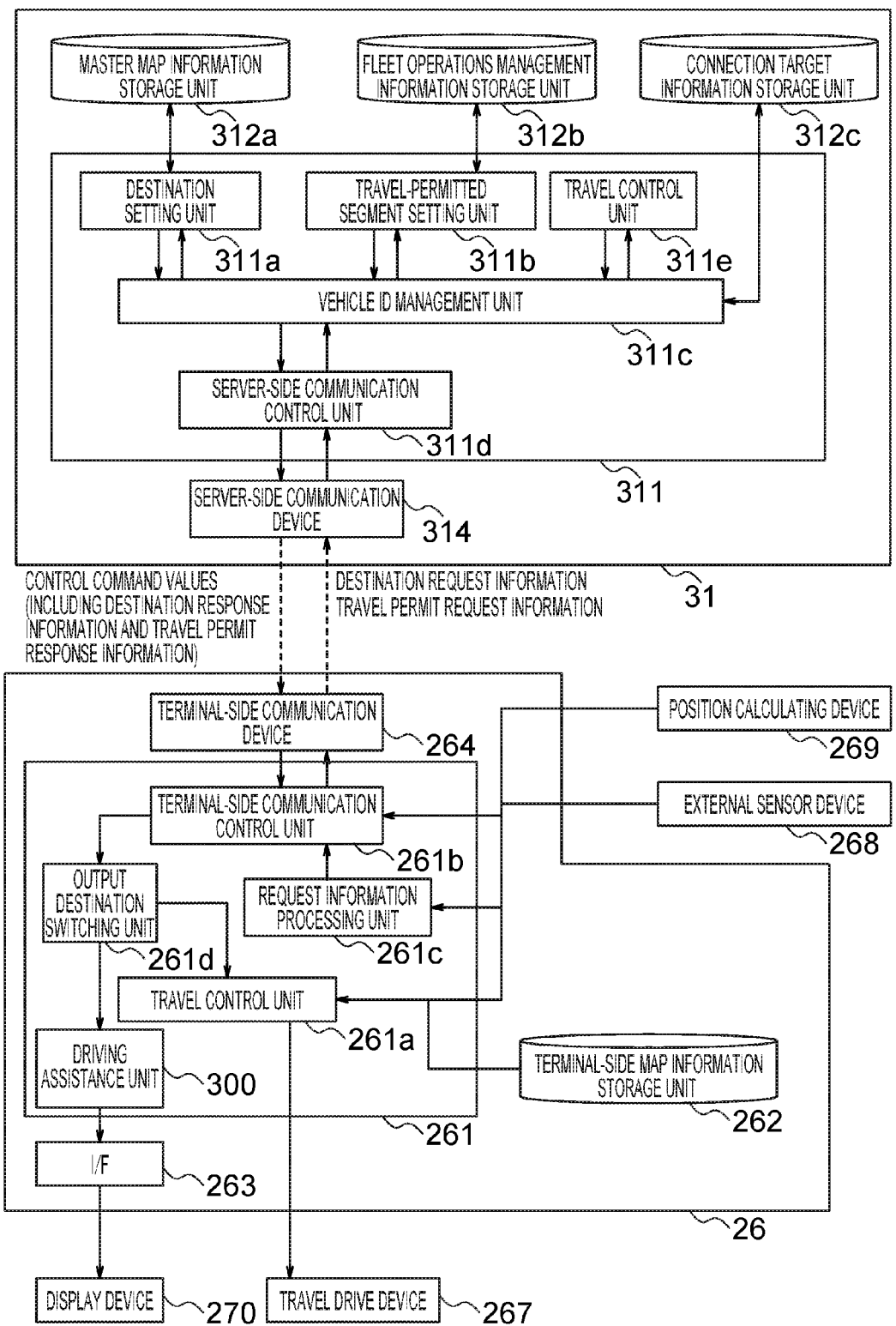
FIG. 4 is a functional block diagram of a program to be executed at a fleet operations management server and traveling terminal device.
Figure 5:
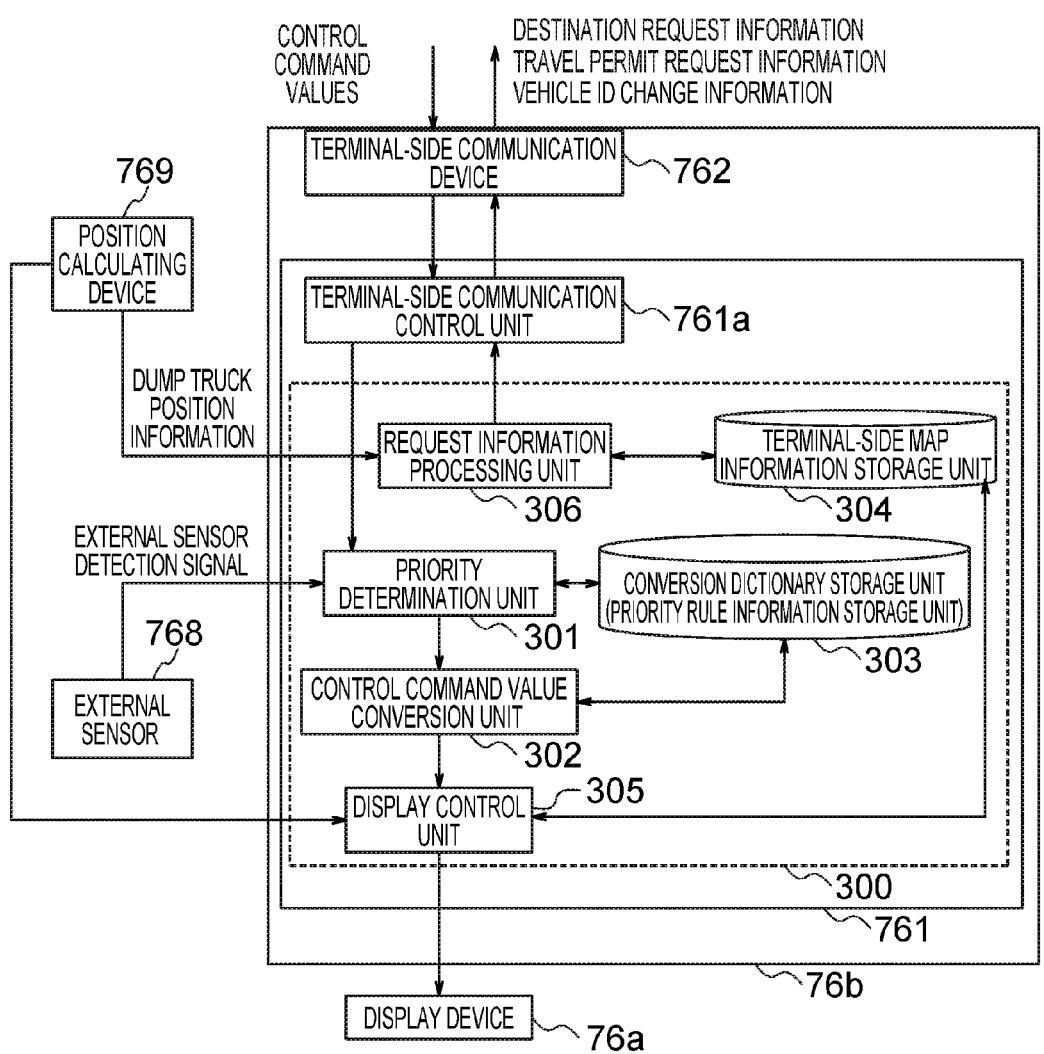
FIG. 5 is a functional block diagram of the driving assistance terminal device.
Figure 10A:
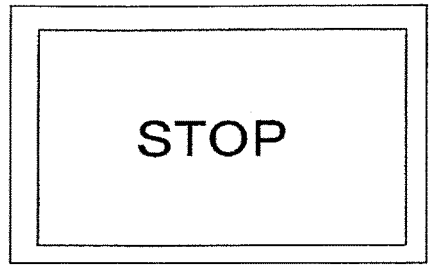
Figure 10B:
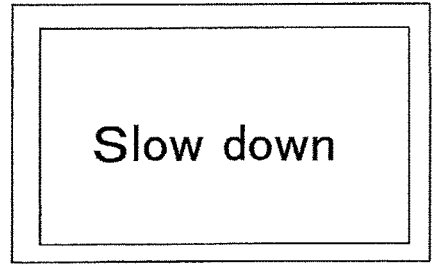
Figure 10C:
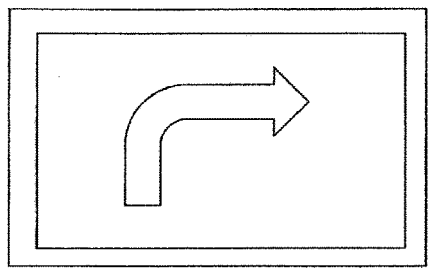
Figure 10D:
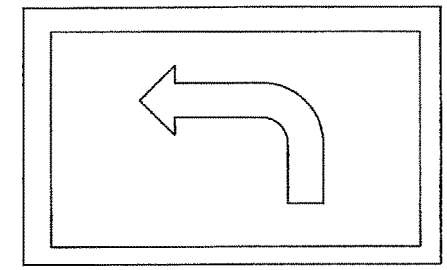
Figure 10E:
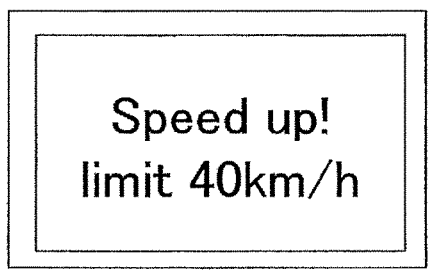
Figure 10F:
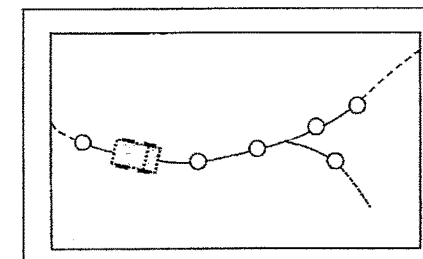
Figure 10G:
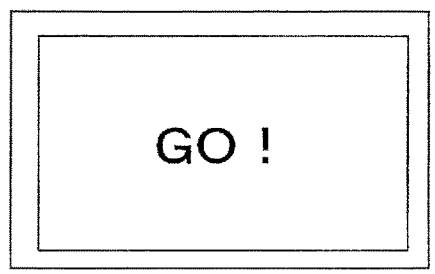

With reference to FIGS. 4 through 10G, a description will be made about the functional configurations of programs to be executed at the fleet operations management server 31, traveling terminal device 26 and driving assistance terminal device 76, respectively. FIG. 4 is a functional block diagram of a program to be executed at a fleet operations management server and traveling terminal device. FIG. 5 is a functional block diagram of the driving assistance terminal device. FIGS. 6A and 6B illustrate map information, in which FIG. 6A illustrates node information and FIG. 6B illustrates link information. FIG. 7 illustrates fleet operations management information. FIGS. 8A and 8B are diagrams illustrating transitions of vehicle ID information, in which FIG. 8A illustrates an example in which a reserve ID is used, and FIG. 8B illustrates an example in which overwriting processing of connection target information is used. FIG. 9 is a diagram illustrating the configuration of a conversion dictionary. FIGS. 10A through 10G show display states of image data in FIG. 9, in which FIG. 10A shows the display state of Image Data 1, FIG. 10B shows the display state of Image Data 2, FIG. 10C shows the display state of Image Data 3, FIG. 10D shows the display state of Image Data 4, FIG. 10E shows the display state of Image Data 5, FIG. 10F shows the display state of Image Data 6, and FIG. 10G shows the display state of Image Data 7.

The fleet operations management server 31 includes a server-side control unit 311, which in turn includes a destination setting unit 311a, a travel-permitted segment setting unit 311b, a vehicle ID management unit 311c, a server-side communication control unit 311d, and a travel control unit 311e. The fleet operations management server 31 also includes a storage unit, which in turn includes a master map information storage unit 312a that stores map information on the haulage route 60 arranged in the mine, a fleet operations management information storage unit 312b that stores fleet operations management information including the current positions of the respective dump trucks and travel-permitted segments set for the dump trucks, a connection target information storage unit 312c that stores vehicle ID information for specifically identifying the respective dump trucks.

When destination request information is received from the traveling terminal device 27 and driving assistance terminal device 76, the destination setting unit 311a sets a destination (which corresponds to a control command value) on the basis of the map information stored in the master map information storage unit 312 and the position information of the unmanned dump truck 20 and manned dump truck 70, said position information being included in the destination request information. The dumping site 62 is set as the destination when the unmanned dump truck 20 and manned dump truck 70 are at the loading site 61, but the loading site 61 is set as the destination when the unmanned dump truck 20 and manned dump truck 70 are at the dumping site 62. An unillustrated parking space may also be set as the destination in some instances.

Upon receipt of the travel permit request information from the traveling terminal device 27 and driving assistance terminal device 76, the travel-permitted segment setting unit 311b sets one of segments of the travel route 60 as a travel-permitted segment (which corresponds to a control command value) for an unmanned dump truck or manned dump truck as a target of segment setting on the basis of the map information stored in the master map information storage unit 312a, the fleet operations management information and the position information of the unmanned dump truck 20 and manned dump truck 70.

The travel control unit 311e generates control command values indicating a stop position of an unmanned dump truck or manned dump truck as a target of control, a travel speed of the unmanned dump truck or manned dump truck as the target of control, a travel or start permit for the unmanned dump truck or manned dump truck as the target of control, a display stop, and refueling timing.

As the destination setting unit 311a, travel-permitted segment setting unit 311b and travel control unit 311e generate control command values, respectively, they correspond to the control command value generation unit. The control command value generation unit generates one or more control command values corresponding to the request information, and outputs the control command values together with the identification information of the unmanned vehicle to the vehicle identification information management unit 311c.

The vehicle identification information management unit 311c manages vehicle identification information that specifically identify the respective dump trucks, and, when the unmanned dump truck 20 has changed to the manned dump truck 70, performs processing to bring the vehicle ID of the manned dump truck into association with the vehicle ID of the unmanned dump truck 20. Hereinafter, the vehicle identification information will be described as "the vehicle ID", and the vehicle identification information management unit 311c will be described as "the vehicle ID management unit 311c".

More specifically, the vehicle identification information management unit 311c outputs request information together with the unmanned dump truck ID, which has been brought into association with the manned dump truck ID, to the control command value generation unit. Further, the vehicle ID management unit 311c specifies the manned dump truck ID associated with the unmanned dump truck ID, extracts connection target information associated with this manned dump truck ID, and outputs this connection target information and the one or more control command values to the server-side communication control unit d.

The server-side communication control unit 311*d* performs control to establish communication connection with the driving assistance terminal device 76. More specifically, when the destination request information and travel permit request information are received, the server-side communication control unit 311*d* outputs them to the vehicle ID management unit 311*c*. When the connection target information and the control command values are received from the vehicle ID management unit 311*c*, the server-side communication control unit 311*d* transmits the control command values by using the connection target information.

Figure 6A:
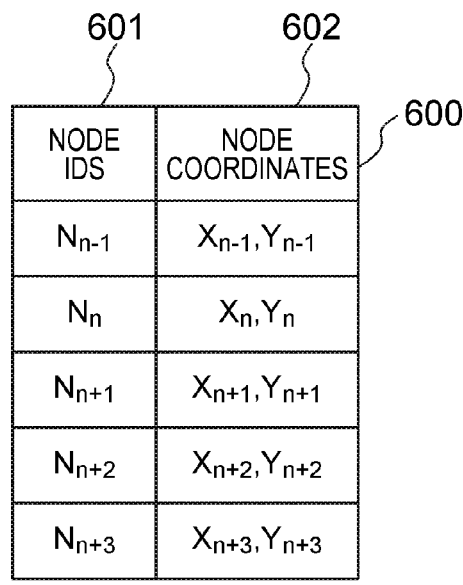
Figure 6B:
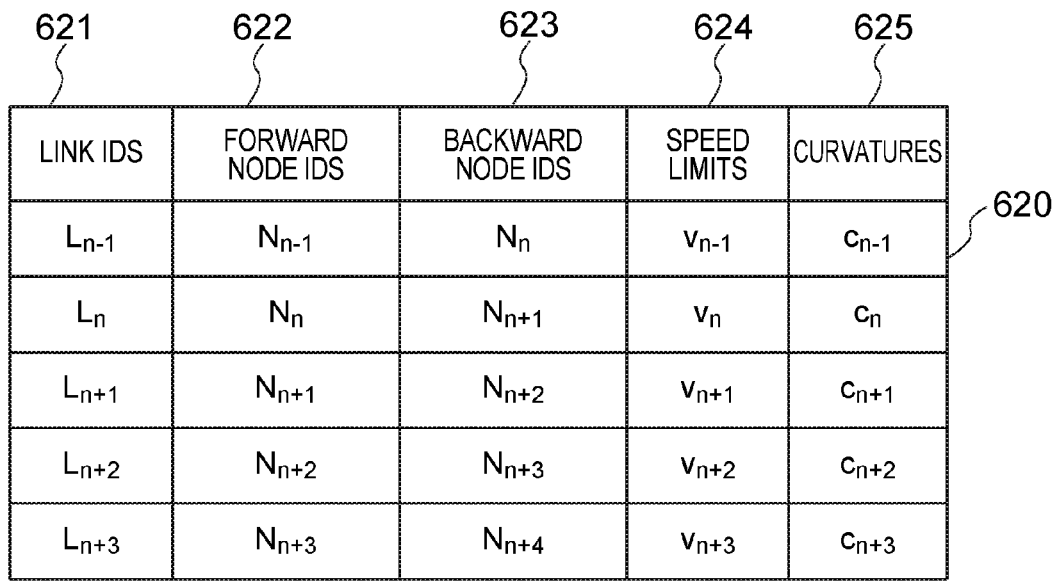

The map information stored in the master map information storage unit 312*a* is defined by individual points (hereinafter called "nodes") on the travel path 60 and links that connect the adjacent nodes to each other. The map information may include terrain information of the mine and the absolute coordinates (three-dimensional real coordinates calculated on the basis of positioning radio waves) of the individual nodes. To the individual nodes and links, position identification information (hereinafter called "node IDs" and "link IDs") are applied to specifically identify these nodes and links. As illustrated in FIGS. 6A and 6B, the map information includes node information 600 in which node IDs 601 and node coordinates 602 are associated with each other (see FIG. 6A), and link information 620 in which link IDs 621, the nodes of forward ends of the links (forward node IDs) 622, the nodes of backward ends of the links (backward node IDs) 623, and as attribute information of the links, for example, speed limits 624, curvatures 625 of the travel route 60 and like are associated with each other (see FIG. 6B).

As illustrated in FIG. 7, fleet operations management information 700 stored in the fleet operations management information storage unit 312*b* stores, in association with "dump truck IDs" 701 that specifically identify the individual dump trucks, "forward boundary points" (indicated by node IDs; applied similarly to backward boundary points) 702 of travel-permitted segments set for the dump trucks, "backward boundary points" 703, "destinations" 704 indicating the coordinates of final destinations currently set for the individual dump trucks, actual "travel speeds" 705 of the dump trucks, "travel directions" 706 indicating whether forward or backward the dump trucks are traveling, and "current positions" 707 of the dumps as informed from the individual dump trucks periodically or as needed.

Figure 8A:
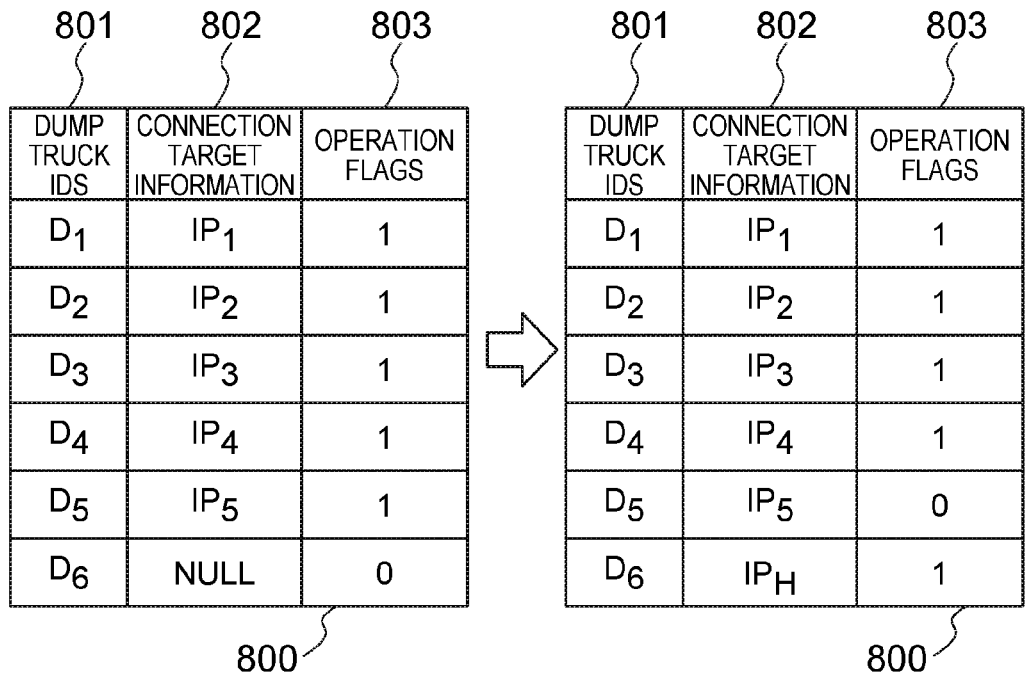
Figure 8B:
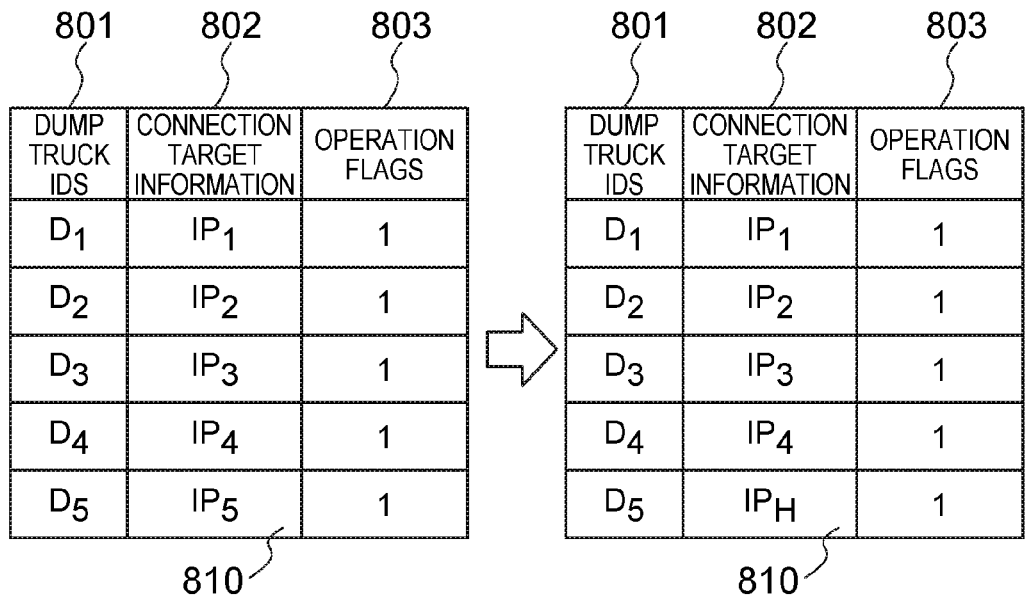

As illustrated in FIGS. 8A and 8B, vehicle ID information 800 stored in the connection target information storage unit 312*c* includes "dump truck IDs" 801 that specifically identify the individual dump trucks, "connection target information" (for example, IP addresses) 802 of wireless communications as assigned to the dump trucks, and "operation flags" 803 for discriminating whether or not the dump trucks are currently in operation.

The manned vehicle can inherently travel without any control command value or values. In the present invention, however, to generate such control command value or values for the manned vehicle, a control target vehicle ID (control target vehicle identification information) is assigned to the manned vehicle to generate the control command value or values, and the control command value or values and the IP address of the driving assistance terminal device mounted on the manned vehicle are managed in association with each other. Upon receipt of request information from the manned vehicle, this request information and control target vehicle ID are outputted in association with each other to the destination setting unit 311*a* or the travel-permitted segment setting unit 311*b* to generate a corresponding control command value for the manned vehicle. Subsequently, the vehicle ID management unit 311*c* acquires the control command value and control target vehicle ID in association with each other, and the server-side communication control unit 311*d* transmits the control command value by using the IP address of the driving assistance terminal device as the destination of transmission. It is, therefore, sufficient for the control target vehicle ID if it allows to discriminate which vehicle is the target of the generation of the control command value. It is possible to use manned vehicle identification information that specifically identifies the manned vehicle. Without being limited to such manned vehicle identification information, however, it is also possible to use reserve vehicle identification information provided beforehand to be assigned to the manned vehicle (see FIG. 8A), or instead, it is possible to use, as identification information of the manned vehicle, unmanned vehicle identification information that specifically identifies an unmanned dump truck which is not in operation (see FIG. 8B). A more detailed description will hereinafter be made about the control target vehicle identification information.

As an example of a transition of the vehicle ID information upon allowing the manned dump truck to travel in place of one of the unmanned dump trucks, FIG. 8A illustrates a case in which the vehicle ID to be used when the manned dump truck has operated is used as a reserve ID. Described specifically, in FIG. 8A, six dump truck IDs, and connection target information and operation flags, said connection target information and operation flags being associated with the dump truck IDs, are stored. Assuming that five dump trucks actually travel in the mine, a reserve dump truck ID (for example, $D_6$) is provided beforehand in the vehicle ID information 800. Assuming that five unmanned dump trucks 20$D_1$-$D_5$ are traveling at first, the operation flags of the "dump IDs" $D_1$-$D_5$ are set at "1" as illustrated in FIG. 8A. It is now assumed that the unmanned dump truck corresponding to the "dump ID" $D_5$ is replaced to the manned dump truck, specifically that, while the five unmanned dump trucks 20$D_1$-$D_5$ are operating as a convoy, the unmanned dump truck corresponding to the "dump ID" $D_5$ is replaced to the manned dump truck. In this case, the reserve "dump ID" $D_6$ is allotted to the manned dump truck, and at the same time, connection target information $IP_H$ of the "dump ID" $D_5$ is allotted to the driving assistance terminal device 76 mounted on the manned dump truck. Further, the operation flag of the "dump ID" $D_5$ is rewritten to "0", while the operation flag of the "dump ID" $D_6$ is rewritten to "1". The rewriting of these vehicle ID information is executed by the vehicle ID management unit 311*c*. In the following description, the operation will be described taking as an example a case in which the reserve ID is used.

As another example of the transition of the vehicle ID information upon allowing the manned dump truck to travel in place of the unmanned dump truck, FIG. 8B illustrates a case in which the vehicle ID management unit 311*c* rewrites the connection target information, which is associated with the "dump ID" $D_5$ in the vehicle ID information 810, into the connection target information $IP_H$ in the driving assistance terminal device 76. In this case, the control command value generation unit executes control command value generation processing for the manned dump truck by using, as the vehicle ID of the manned dump truck, the "dump ID" $D_5$ which has been assigned to the unmanned dump truck. As the connection target information for the vehicle ID information has been rewritten to $IP_H$ upon transmission of the control command value to the driving assistance terminal device 76, the vehicle ID management unit 311c can transmits the control command value to the driving assistance terminal device 76.

Referring back to FIG. 4, a description will be made about the traveling terminal device 26. The traveling terminal device 26 in this embodiment will be described as one provided with a function, which performs, on the basis of the control command value, travel control on a travel drive device 267 mounted on the unmanned dump truck 20, and another function that performs a similar display as the driving assistance terminal device 76 when the operator rides the unmanned dump truck 20 and the unmanned dump truck 20 performs traveling according to operation by the operator. Even with the unmanned dump 20, the operator may ride and operate it. In such a case, the traveling terminal device 26 is configured to permit storing and executing the driving assistance program according to the present invention to provide driving assistance to the operator so that the behavior of the unmanned dump truck 20 becomes similar to that at the time of autonomous traveling.

The traveling terminal device 26 includes a terminal-side control device 261, a terminal-side map information storage unit 262, I/F 263, and a terminal-side communication device 264, and is connected to an external sensor device 268, such as a millimeter-wave radar or a stereo camera, and also to a position calculating device 269 that is mounted on the unmanned dump truck 20 and includes GPS and IMU. Detection results of the external sensor device 268 and position calculating device 269 are used in autonomous travel control at the traveling terminal device 26. The traveling terminal device 26 is also connected to the travel drive device 267, which includes brakes, a steering system, a fuel injection system and the like.

The terminal-side control device 261 of the traveling terminal device 26 is provided with a travel control unit 261a, a terminal-side communication processing control unit 261b, a request information processing unit 261c, an output destination switching unit 261d that switches the output destination of the control command value from the fleet operations management server 31, and a driving assistance unit 300.

The travel control unit 261a performs autonomous travel control on the travel control device 267 according to the current position of the own vehicle as acquired from the position calculating device 269, map information in a terminal-side map information storage unit 262 and the travel-permitted segment included in the travel permit response information.

The travel control unit 261a also determines the existence or non-existence of a forward obstacle on the basis of a detection result of the external sensor device 268, determines the existence or non-existence of any potential interference with the obstacle and the existence or non-existence of any evasive action for a collision, and if necessary, performs control for braking operation.

The terminal-side communication control unit 261b performs control to perform a wireless communication with the fleet operations management server 31.

The request information processing unit 261c generates destination request information and travel permit request information with reference to the current position of the dump truck 20 and the map information, and outputs them to the terminal-side communication control unit 261d.

The output destination switching unit 261d controls such that the control command values/value are/is outputted to the travel control unit 261a and/or driving assistance unit 300 during autonomous traveling, but are/is outputted to only the driving assistance unit 300 during traveling by the operator. It is to be noted that the output to the driving assistance unit 300 during autonomous traveling can facilitate, for example, when the operator rides and confirms the behavior of autonomous traveling, the confirmation of action as to whether or not the behavior of the unmanned dump truck 20 is following an instruction from the fleet operations management server 31. The switching of the output destination is performed by an input device (for example, a button) for performing autonomous travel control, or on the basis of input information of an action for transferring the initiative of operation to the operator (for example, detection information of a depression stroke of a brake pedal, detection information of a steering angle by a steering operation, or the like).

The driving assistance unit 300 executes the driving assistance program according to the pre sent invention. The driving assistance program is a program, which allows a computer (hardware) to execute a step of converting the contents of each received control command value to at least one of visual information and auditory information and a step of providing the at least one of the visual information and auditory information to the operator. As the contents of the received control command value are converted to the visual information in this embodiment, the driving assistance unit 300 displays image data, to which the control command value has been converted, on the display device 270 connected via I/F 263.

As illustrated in FIG. 5, the terminal device main body 76b of the driving assistance terminal device 76 includes terminal-side control device 761 and terminal-side communication device 762, and is connected to an external sensor device 768 and the display device 76a, which are mounted on the manned dump truck 70.

The terminal-side control device 761 includes a terminal-side communication control unit 761a and the driving assistance unit 300.

The driving assistance unit 300 includes a priority determination unit 301, a control command value conversion unit 302, a conversion dictionary storage unit 303, a terminal-side map information storage unit 304, a display control unit 305, and a request information processing unit 306.

The priority determination unit 301 receives an input of the control command value from the fleet operations management server 31 via the terminal-side communication device 762 and terminal side communication control unit 761a, and upon acquisition of a detection signal from the external sensor device 768 and dump truck position information from a position calculating device 769, determines the priority of the information, which is to be provided to (displayed for) the operator, out of the control command values. When there are plural control command values, the priority determination unit 301 determines only the control command value, the priority of which is the highest, as a signal to be provided to the operator, and outputs only the control command value to the control command value conversion unit 302. Upon determination of priority, the priority determination unit 301 refers to priority rule information that specifies the priority of each control command value. In this embodiment, a conversion rule, which specifies to what image data the control command values are converted, and a priority rule are defined together into a single conversion dictionary. About its details, a description will be made subsequently herein with reference to FIG. 9.

The control command value conversion unit 302 extracts, with reference to the conversion rule, an image corresponding to an input signal that has been determined to have the highest priority out of information acquired by the priority determination unit 301 and inputted at certain time points (which may be predetermined time spans set based on the behavior, stop distance, time limit or the like of the dump truck). When the control command signal is travel permit response information, the map information in the terminal-side map information storage unit 304 is also referred to.

The display control unit 305 outputs the image, which the control command value conversion unit 302 has extracted, to the display device 76a. If the control command value conversion unit 305 outputs the image, to which the travel permit response information has been converted, as data to be displayed, a map image to be displayed by discriminating the travel-permitted segment for the own vehicle from the remaining segments (which are equivalent to the closed segments as viewed from the own vehicle) on the travel route 60 is generated. In addition, the generation of an image with, for example, a stop instruction image superimposed on the map image is also performed. Therefore, the display control unit 305 corresponds to the control command value providing unit.

The request information processing unit 306 generates destination request information and travel permit request information according to the position of the dump truck on the basis of the dump position information acquired from the position calculating device 769 and the map information stored in the terminal-side map information storage unit 304, and outputs them to the terminal-side communication control unit 761a. These information are then transmitted from the terminal-side communication device 762 to the wireless communication network 40, and are received by the fleet operations management server 31. Further, when the vehicle ID change information, which indicates in place of which unmanned dump truck the operator allows the manned dump truck to travel, is inputted from the input device of the terminal device main body 76a, the vehicle ID change information is also transmitted to the fleet operations management server 31.

The input action of the vehicle ID change information may be performed from an unillustrated input device of the fleet operations management server 31.

Referring to FIG. 9, a description will be made about the conversion dictionary stored in the conversion dictionary storage unit 303. As illustrated in FIG. 9, the conversion dictionary 900 includes "control command values/input signals" 901 that indicate the kinds of input signals, "priorities" 902 that specify the display priorities of the individual signals, "image data" 903 that indicate the contents of the control command values/input signals, and "display contents" 904 that describe the contents which the individual image data indicate. It is to be noted that the "display contents" 904 are illustrated in FIG. 9 for the convenience of description but the "display contents" 904 are not essential in an implementation. In this embodiment, the priority rule information is included in the conversion dictionary by providing the column of "priorities" 902 in the conversion dictionary 900. However, the conversion rule and priority rule may be separately configured.

The "control command values/input signals" 901 specify, in addition to the control command values from the fleet operations management server 31, input signals from an external sensor device, for example, a millimeter-wave radar installed on the unmanned dump truck 20 or manned dump truck 70.

The "priorities" 902 are higher in priority as the number becomes smaller. If there are plural control command values and/or input signals in a predetermined time, the image data of higher priority is selectively displayed. When the "millimeter-wave forward obstacle detection signal (which corresponds to a stoppable distance)" (priority 1) is received from the external sensor device 768 in a state that the "torque increase command" (priority 2) has been received from the fleet operations management server 31, the priority determination unit 301 determines such that the "millimeter-wave forward obstacle detection signal (which corresponds to a stoppable distance)" (priority 1) is preferentially displayed. The priority may be set according to the urgency or importance of the contents of each control command value.

FIGS. 10A through 10G show the states of Image Data 1 to 7, which are stored in the "image data" 903, as displayed on the display device 76a. The display contents to the display device 76a can be character information (see FIG. 10A, 10B, 10E or 10G), or can be graphic information (see FIG. 10C or 10D). Their display durations may be, for example, as those determined beforehand for the respective image data, or on the basis of travel data of the manned dump truck, the display control unit 305 may determine whether or not the instruction, which indicates the control command value or input signal, has been performed, and may stop the display. In this case, the display duration is from a time point, at which the display of the control command value has been started, until the stop of the display. As the timing at which the display is to be stopped, it can be configured, for example, such that a display of "STOP" disappears when the speed decreases to "0" based on an actual travel speed from a wheel speed sensor (FIG. 10A), a display of "Slow down" disappears when the wheel speed decreases to a predetermined value (the speed included in a control instruction signal) (FIG. 10B), or a display of a right direction or left direction disappears upon receipt of a detection signal indicating that the steering angle of a steering device has returned from θ° to −θ° with respect to a longitudinal direction (has returned to 0 with respect to the longitudinal direction) (FIG. 10C or 10D). Further, it can also be configured such that a display disappears when the wheel side reaches a speed limit (the speed limit is included in the map information stored in the terminal-side map storage unit or in the control instruction signal) (FIG. 10E) or a display of "GO!" (FIG. 10G) disappears when a dynamic path is received while standing by at an entrance to a loading position and the wheel side increases from 0.

Furthermore, a map display, in which a travel-permitted segment allotted to the own vehicle and the remaining segments, which are closed, are discriminated from each other on a travel path (FIG. 10F), with the position of the own vehicle being superimposed on the display device 76a, may be continuously displayed if there is none of the above-described other display contents. If there is any one of the above-described other display contents, however, the map display may be switched to the other display contents and the other display contents may then be displayed. In this case, it may be configured such that the display returns to the map display when the display of the above-described other display contents stops.

Figure 11A:
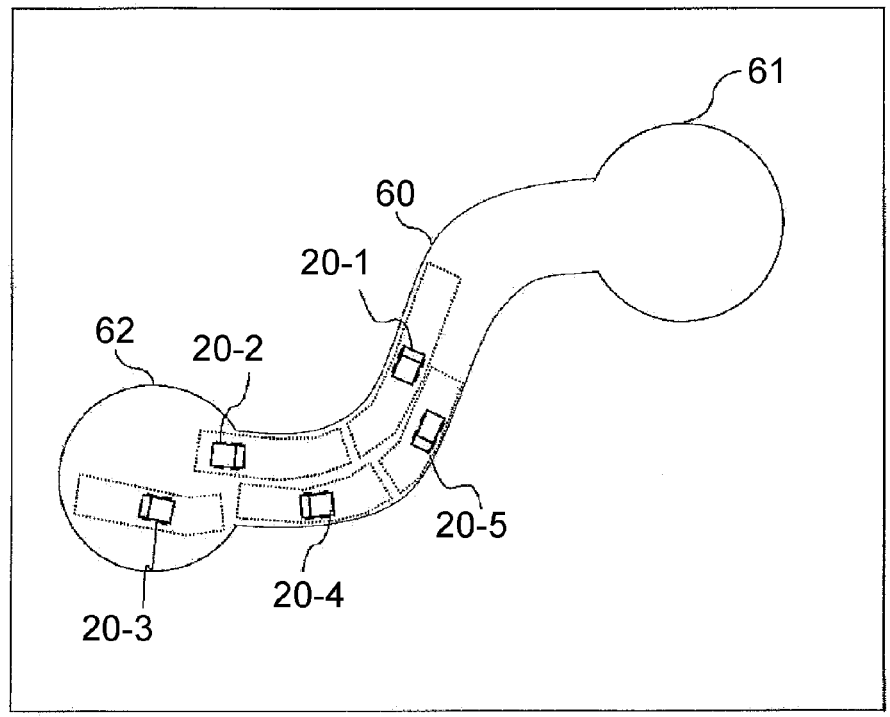
Figure 11B:
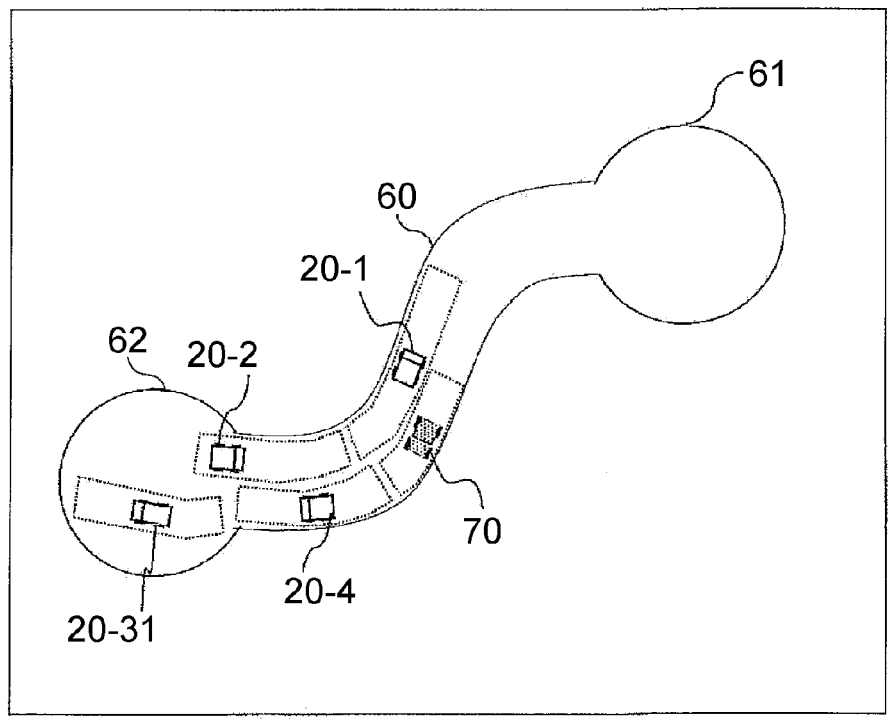
Figure 12:
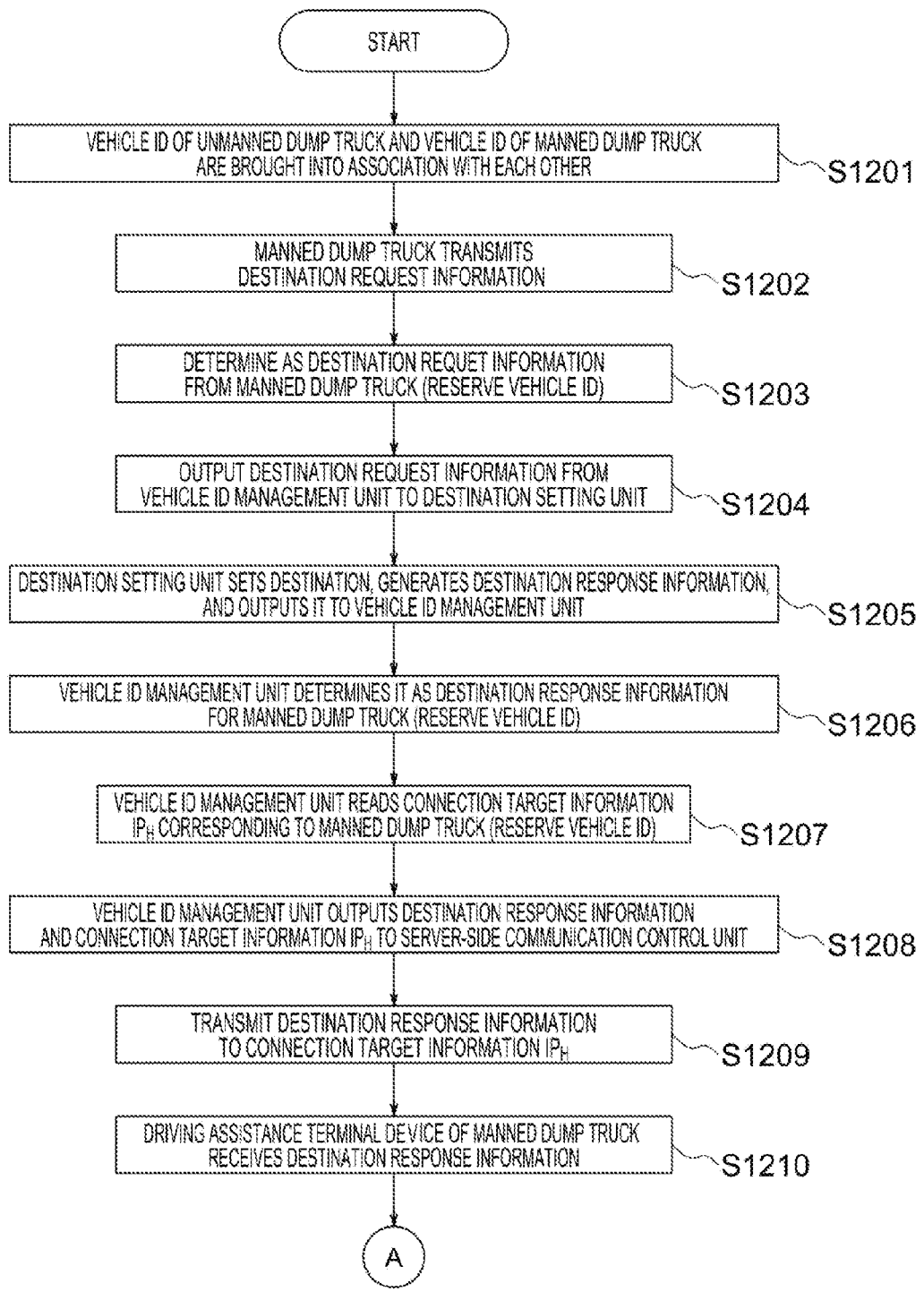
FIG. 12 is a flow chart illustrating the flow of operation (the first half) by the driving assistance system.

With reference to FIGS. 11A to 13, a description will next be made about the flow of operation by the driving assistance system according to this embodiment. FIGS. 11A and 11B are diagrams illustrating travel states of dump trucks, in which FIG. 11B illustrates a travel state in which a manned dump truck is allowed to travel together with unmanned dump trucks, and FIG. 11A illustrates a state in which only unmanned dump trucks are allowed to travel autonomously. FIG. 12 is a flow chart illustrating the flow of operation (the first half) by the driving assistance system. FIG. 13 is a flow chart illustrating the flow of operation (the second half; continued from FIG. 12) by the driving assistance system.

In the following example, a description will be made by taking, as an example, a case in which plural dump trucks, for example, four unmanned dump trucks 20-1,20-2,20-3, 20-4 and one manned dump truck 70 make up a group (convoy) and are allowed to travel together. The fleet operations management server 31 performs the fleet operations management of the five dump trucks, and is characterized in that one of the five dump trucks is the manned dump truck.

If the dump trucks in operation are all unmanned dump trucks and each unmanned dump truck autonomously travels according to control command values from the fleet operations management server 31 (FIG. 11A), fleet operations management by the fleet operations management server 31 is realized. If the unmanned dump truck is combined (see FIG. 11B), however, the behavior of the manned dump truck is determined according to operation by the operator. Then, if the operation by the operator is different from a control command value from the fleet operations management server 31, the fleet operations management by the fleet operations management server 31 may not be realized depending on the accuracy of the operation by the operator relative to the control command value (the follow-up performance of the operation to the control command value). The driving assistance system according to this embodiment takes, as an ideal state, the behavior according to control command values at the time of autonomous traveling, and provides driving assistance to the operator of the manned dump truck so that the manned dump truck performs the behavior in the ideal state. Hereinafter, a description will be made in the order of individual steps in FIGS. 12 and 13.

First, the vehicle ID ($D_5$) of the unmanned dump truck 20-5 and the vehicle ID of the manned dump truck are brought into association with each other (S1201). This association may be conducted, for example, by transmitting vehicle ID conversion request information, which indicates to travel as the unmanned dump truck (vehicle ID: $D_5$), from the driving assistance terminal device 76 of the manned dump truck 70 to the fleet operations management server 31 and allowing the vehicle ID management unit 311c to apply the reserve vehicle ID ($D_6$) to the manned dump truck 70. In FIG. 8A described above, the vehicle ID of the unmanned dump truck 20-5 is valid (in the state that the operation flag is "1"). After the execution of this step, however, the vehicle ID management unit 311c changes the vehicle ID of the unmanned dump truck 20-5 to "invalid" (the state that the operation flag is "0") and also the reserve vehicle ID ($D_6$) to "valid" (the state that the operation flag is "1").

If the fleet operation management server 31 and the respective dump trucks are connected together via the wireless communication network 40 by using a versatile wireless communication standard (for example, Wi-Fi), an IP address ($IP_H$), which indicates a source of transmission (the driving assistance terminal device 76 mounted on the manned dump truck 70), is included in the vehicle ID conversion request information. Therefore, the vehicle ID management unit 31 reads the IP address ($IP_H$), and records it as the connection target information for the reserve vehicle ID ($D_6$). In this manner, the connection target information on the reserve vehicle ID ($D_6$) can be set.

As illustrated in FIG. 8B, the vehicle ID management unit 311c may alternatively rewrite the connection target information for the vehicle ID ($D_6$) to the IP address of the driving assistance terminal device 76.

The manned dump truck 70 next joins to the position of the unmanned dump truck 20-5 in the convoy, and along with the four unmanned dump trucks, performs preparation for the initiation of traveling. When the manned dump truck 70 transmits destination request information upon initiating traveling (S1202), the vehicle ID management unit 311c compares the IP address in the destination request information with the vehicle ID information in FIG. 8, and determines it to be the destination request information from the reserve vehicle ID ($D_6$) (S1203).

Next, the vehicle ID management unit 311c outputs the destination request information to the destination setting unit 311a (S1204).

When the destination setting unit 311a generates destination response information and outputs it to the vehicle ID management unit 311c (S1205), the vehicle ID management unit 311c determines it to be destination response information for the reserve vehicle ID ($D_6$) with reference to the vehicle ID information of FIG. 8B (S1206), reads the connection target information $IP_H$ for the reserve vehicle ID ($D_6$) from the vehicle ID information (S1207), and outputs the destination response information and connection target information $IP_H$ to the server-side communication control unit 311d (S1208).

The server-side communication control unit 311d transmits the destination response information to the connection target information $IP_H$ (S1209), and the driving assistance terminal device 76 of the manned dump truck 70 receives it (S1210).

The request information processing unit 261c of the driving assistance terminal device 76 generates travel permit request information and transmits it to the fleet operations management server 31 (S1211), and the vehicle ID management unit 311c outputs it to the travel-permitted segment setting unit 311b (S1212). The travel-permitted segment setting unit 311b generates travel permit response information, and similar to Steps S1205 and S1206, the vehicle ID management unit 311c outputs the travel permit response information and connection target information $IP_H$ to the server-side communication control unit 311d (S1213).

The server-side communication control unit 311d transmits the travel permit response information to the connection target information $IP_H$ (S1214), and the driving assistance terminal device 76 of the manned dump truck 70 receives it (S1215).

Upon acquisition of the travel permit response information, the priority determination unit 301 determines its priority with reference to the conversion dictionary of FIG. 9 (S1216). If there is no control command value or input signal having a priority higher than the travel permit response information (S1217/No), the control command value conversion unit 302 determines, with reference to the conversion dictionary, that the image data corresponding to the travel permit response information is "Image data 6" (S1218).

The control command conversion unit 302 outputs, to the display control unit 305, an instruction to generate a map image corresponding to "Image 6", and the display control unit 305 executes display control such as the generation of an image of the map image with the position of the own vehicle superimposed thereon (FIG. 10F) on the basis of the dump position information (S1219), and displays it on the display device 76a (S1220). It is to be noted that the term "display" as used here includes a switched display, and also includes a stop of display after an elapse of a predetermined display duration.

If there is a control command value or input signal having a priority higher than the travel permit response information (S1217/Yes), the priority determination unit 301 determines the control command value or input signal of higher priority as a display target, and processing by the control command conversion unit 302 is executed (S1221).

Under operation by the operator of the manned dump truck 70, traveling of the manned dump truck is initiated, and during traveling, the request information processing unit 306 transmits request information to the fleet operations management server 31 under the same conditions as the unmanned dump truck. The fleet operations management server performs autonomous travel control of the manned dump truck as the unmanned dump truck (S1222).

If a control command value is not newly received from the fleet operations management server 31 or an external sensor detection signal is not newly inputted (S1233/No), the display of the map is continued (S1220).

When a new control command value is received or a new external sensor detection signal is inputted (S1223/Yes), the travel permit response information in the above description is substituted for the newly-received control command value, and the processing of step S1216 onwards is repeated.

According to this embodiment, when the manned dump truck and unmanned dump trucks travel together, the fleet operations management server can display and communicate a control command value, which has been transmitted to the manned dump truck, to the operator of the manned dump truck while the fleet operations management server is performing autonomous travel control on the manned dump truck as one of the unmanned dump trucks. As a result, when the operator operates under the contents as received, the manned vehicle is allowed to travel closer to the state of traveling of the unmanned dump truck. This makes it possible to perform autonomous travel control in a state that the manned dump truck and the unmanned dump trucks exist together.

The above-described embodiment is illustrative for describing the present invention, and is not intended to limit the scope of the present invention to the above-described embodiment. Those skilled in the art can practice the present invention as various other embodiments to an extent not departing from the spirit of the present invention.

It is possible, for example, to mount a drive recorder on the manned dump truck and to provide a function to store each drive operation by the operator and the results of conversion of its corresponding control command value, which has been provided by the driving assistance terminal device, in association with each other in the drive recorder. In this case, if a trouble (accident) occurs to the manned dump truck, it is possible to easily elucidate which of an operation mistake by the operator or a conversion error of the control command value is responsible for the trouble (accident).

LEGENDS

1: driving assistance system, 10: excavator, 20: unmanned dump truck, 31: fleet operations management server, 40: wireless communication network, 70: manned dump truck.

The invention claimed is:

1. A driving assistance system, comprising:
a driving assistance terminal device mounted on a first-type haulage vehicle driven by an operator;
a second-type haulage vehicle with an autonomous traveling function applied to the first-type haulage vehicle; and
a fleet operations management server, which performs fleet operations management of the first-type haulage vehicle and second-type haulage vehicle, the driving assistance terminal device, the second-type haulage vehicle and the fleet operations manager are connectable together for communications via a wireless communication network,
wherein the fleet operations management server is a computer programmed to: establish a communicable connection with each of the driving assistance terminal device and second-type haulage vehicle, and
generate a control command value, which is to be used for autonomous travel control by a travel control unit mounted on the second-type haulage vehicle, and a control command value for allowing the first-type haulage vehicle to travel according to operations management by the fleet operations management server,
wherein the driving assistance terminal device is a computer, to which a light, a speaker, or a display device is connected, and which is programmed to establish a communicable connection to the fleet operations management server,
generate, to the fleet operations management server, request information to request a control command value for the first-type haulage vehicle,
store therein conversion dictionary information, said conversion dictionary information including the control command value and perceivable data, which allows the operator to recognize contents of the control command value, associated with each other,
convert the received control command value to the associated perceivable data with reference to the conversion dictionary information, and
output the converted perceivable data to the light, the speaker, or the display device; and
wherein the fleet operations management server is further programmed to responsive to the request information, generate a control command value for the first-type haulage vehicle when receiving the request information from the driving assistance terminal device.

2. The driving assistance system according to claim 1, wherein:
the fleet operations management server further includes:
a connection target information storage unit that stores connection target management information in which vehicle identification information, that specifically identifies the second-type haulage vehicle, and connection target information for a wireless communication as applied to the second-type haulage vehicle indicated by the vehicle identification information are associated with each other, and
a vehicle identification information management unit that manages the vehicle identification information;
the connection target management information includes reserve vehicle identification information which is not associated with any specific connection target information;
the vehicle identification information management unit, upon receipt of the request information from the driving assistance terminal device, brings connection target information for the reserve vehicle identification information into association with connection target information of the driving assisting terminal device mounted on the first-type haulage vehicle, and outputs the reserve vehicle identification information and the request information to the control command value generation unit;

the control command value generation unit outputs, to the vehicle identification information management unit, the control command value together with the reserve vehicle identification information added thereto;

the vehicle identification information management unit, with reference to the connection target management information, specifies the connection target information associated with the reserve vehicle identification information, and outputs the specified connection target information and the control command value to the server-side communication control unit; and the server-side communication control unit transmits the control command value toward the specified connection target information.

3. The driving assistance system according to claim 1, wherein:

the fleet operations management server further includes:

a connection target information storage unit that stores connection target management information in which vehicle identification information, that specifically identifies the second-type haulage vehicle, and connection target information for a wireless communication as applied to the second-type haulage vehicle indicated by the vehicle identification information are associated with each other, and a vehicle identification information management unit that manages the vehicle identification information;

when allowing the first-type haulage vehicle to operate in place of the second-type haulage vehicle which is in operation, the vehicle identification information management unit rewrites connection target information, which has been brought into association with the vehicle identification information indicating the second-type haulage vehicle as a target of replacement, to connection target information for the driving assistance terminal device mounted on the first-type haulage vehicle to be operated instead, and outputs, to the control command value generation unit, the vehicle identification information, which indicates the second-type haulage vehicle as the target of replacement, and the request information received from the driving assistance terminal device;

the control command value generation unit outputs, to the vehicle identification information management unit, the control command value together with the vehicle identification information of the second-type haulage vehicle, which has become the target of replacement, as added thereto;

the vehicle identification information management unit, with reference to the connection target management information, specifies the connection target information associated with the vehicle identification information of the second-type haulage vehicle as the target of replacement, and outputs the specified connection target information and the control command value to the server-side communication control unit; and the server-side communication control unit transmits the control command value toward the specified connection target information.

4. A first-type haulage vehicle driven by an operator and connectable to a fleet operations management server, which performs fleet operations management of a second-type haulage vehicle with an autonomous traveling function applied thereto and the first-type haulage vehicle, for communications via a wireless communication network, comprising:

a driving assistance terminal device constituted of a computer; and an external sensor device that is connected to the driving assistance terminal device and detects a front obstacle of the first-type haulage vehicle, wherein the driving assistance terminal device is programmed to:

receive, from the fleet operations management server, a control command value consisting of a control command value of a same kind as a control command value, which a travel control unit mounted on the second-type haulage vehicle uses for autonomous travel control and which is used for allowing the first-type haulage vehicle to travel according to operations management by the fleet operations management server;

store therein conversion dictionary information, said conversion dictionary information including the control command value and perceivable data, which allows the operator to recognize contents of the control command value, associated with each other;

convert the received control command value to the associated perceivable data with reference to the conversion dictionary information; and provide the converted perceivable data to the operator.

5. Driving assistance terminal device to be mounted on a first-type haulage vehicle that is driven by an operator, comprising:

a terminal-side communication control unit that receives, from a fleet operations management server which performs operations management of an autonomously-traveling, second-type haulage vehicle and the first-type haulage vehicle, a control command value consisting of a control command value of a same kind as the control command value, which a travel control unit mounted on the second-type haulage vehicle uses for autonomous travel control and which is used for allowing the first-type haulage vehicle to travel according to operations management by the fleet operations management server;

a conversion dictionary storage unit with conversion dictionary information stored therein, said conversion dictionary information including the control command value and perceivable data, which allows the operator to recognize contents of the control command value, associated with each other;

a control command value conversion unit that converts the control command values, which the terminal-side communication control unit has received, to the associated perceivable data with reference to the conversion dictionary information; and a notification unit that provides the converted perceivable data to the operator.

6. The driving assistance terminal device according to claim 5, wherein:

the control command value is at least one of a travel-permitted segment that is a segment, for which a travel permit has been given to the first-type haulage vehicle, on a travel route on which the first-type haulage vehicle travels, a stop position of the first-type haulage vehicle, a travel speed of the first-type haulage vehicle, a travel or start permit for the first-type haulage vehicle, a display stop, and refueling timing.

7. The driving assistance terminal device according to claim 5, wherein:

the control command value conversion unit converts the control command value to at least one of image data indicating the contents of the control command value, a blinking light, and a voice indicating the contents.

8. The driving assistance terminal device according to claim 5, further comprising:

a priority determination unit that determines a priority at which the control command value is to be provided to the operator, wherein the control command value conversion unit converts the control command value that has been determined as having a highest priority by the priority determination unit.

9. A non-transitory computer readable medium having a computer program product for a driving assistance program for allowing an operator to perform driving according to operations management by a fleet operations server that performs operations management of a second-type haulage vehicle having an autonomous traveling function, said driving assistance program allowing a computer to execute:

a step of receiving, from the fleet operations management server, a control command value consisting of a control command value of a same kind as a control command value, which a travel control unit mounted on the second-type haulage vehicle uses for autonomous travel control and which is used for allowing a vehicle, which is driven by the operator, to travel according to operations management by the fleet operations management server;

a step of converting the received control command value to associated perceivable data with reference to a conversion dictionary information in which the control command value and perceivable data, which allows the operator to recognize contents of the control command value, are associated with each other; and a step of notifying that provides the converted perceivable data to the operator.

10. A second-type haulage vehicle in which an autonomous traveling function is applied to a first-type haulage vehicle driven by an operator to travel, comprising:

a traveling terminal device constituted of a computer, which is programmed to perform autonomous travel control according to a control command value received from a fleet operations management server via a wireless communication network;

an external sensor device that is connected to the traveling terminal device and detects a front obstacle of the second-type haulage vehicle; and a light, a speaker, or a display device that is connected to the traveling terminal device and outputs perceivable data that allows an operator, who rides the second-type haulage vehicle, to recognize contents of the control command value, wherein the traveling terminal device is further programmed to:

receive, from a fleet operations management server which performs operations management of the first-type haulage vehicle and second-type haulage vehicle, the control command value, which a travel control unit mounted on the second-type haulage vehicle uses for autonomous travel control, via a wireless communication network;

switch an output destination of the control command value to a travel control process or a driving assistance process;

if the output destination of the control command value is switched to the travel control process, perform the autonomous travel control based on the control command value;

if the output destination of the control command value is switched to the driving assistance process, convert the contents of the control command value to the perceivable data;

output converted perceivable data to the light, the speaker, or the display device;

store therein conversion dictionary information, said conversion dictionary information including the control command value and perceivable data associated with each other; and converts the received control command value to the associated perceivable data with reference to the conversion dictionary information.

* * * * *